United States Patent Office 3,291,634
Patented Dec. 13, 1966

3,291,634
METHOD OF RENDERING ARTICLES
WATER REPELLENT
Nobuaki Wada, Ibaraki-shi, Kazumune Nakao, Higashi-sumiyoshi-ku, Osaka-shi, Toshiya Tsuji, Yao-shi, Osaka-fu, and Mitsugi Shibata, Fushimi-ku, Kyoto-shi, Japan, assignors to The Governor of Osaka-fu, Japan; Higashi-ku, Osaka-shi, Japan, and a foundation under the law of Japan, Nihon Mengyo Gijutsu Kenkyusho, Mengyo Kaikan, Bengomachi, Higashi-ku, Osaka-shi, Japan
No Drawing. Filed Sept. 13, 1963, Ser. No. 308,647
4 Claims. (Cl. 117—135.5)

This invention relates to a method of rendering articles water repellent. More particularly, the invention pertains to the application of a mixture consisting of a polysiloxane having a methylhydrogensiloxane unit in a specific weight percent and a specific metallic salt of lower aliphatic acids. The articles wetted therewith are allowed to dry at room temperature without subjecting to heating processing.

Methylhydrogenpolysiloxane is well known in the art as a useful water repellent agent which is usually applied in a state of emulsion, and the articles wetted therewith are conventionally heated at a high temperature, usually over 150° C. or thereabout, to thermally decompose the hydrophilic group contained in the emulsifier. In order to increase water repellency and wash durability, furthermore, there is added to said agent a catalyst, such as zinc acetate, sodium bicarbonate, zinc or stannous 2-ethylhexanoate or zirconium oxychloride, in the order of a few percent by weight of the methylhydrogenpolysiloxane employed.

When allowed to dry at room temperature, however, methylhydrogenpolysiloxane fails to produce the desired water repellency because of the hydrophilic group contained in the emulsifier, and the catalyst employed remains unable to exhibit the desired effect thereof to the fullest extent. When heated, the resultant water repellency is greatly damaged even by a single operation of washing in case of cotton, rayon, polyvinyl alcohol and the like hydrophilic fibers and fabrics, although effective for nylon, polyester, cellulose acetate and the like hydrophobic fibers and fabrics.

There is disclosed in the United States Patent 2,588,365 a method of applying a mixture of methylhydrogenpolysiloxane and dimethylpolysiloxane at a temperature ranging from 100° to 475° F. However, it remains also impracticable for said patent to achieve the desired water repellency without subjecting the wetted articles to a heating processing in order to thermally decompose the emulsifier, so that the patent can hardly be applicable to the materials having poor heat resistance.

In the prior art, accordingly, where polysiloxanes are employed as a water-repellent agent, the heating processing is indispensable, rendering it impracticable to apply the method to the articles having poor heat resistance and structural inconveniences hardly subjectable to heating processing.

The primary object of the present invention is to provide a water-repelling method which can be applied without the use of heating processing.

A second object of the invention is to provide a water repelling method which can be applied not only to any forms of articles having poor heat resistance but to those articles or constructions having structural inconveniences hardly subjectable to heating processing.

A further object of the invention is to provide a water repelling method which can impart to hydrophobic and hydrophilic materials as well as an excelled water repellency and a high resistance to washing and dry cleaning.

To materialize said objects and other specific features which will become aparent from the following description, there is dissolved in the aqueous emulsion of a polysiloxane having a methylhydrogensiloxane unit in a specific weight percent and a specific metallic salt of lower aliphatic acids in a concentration as will be specified later. The article to be treated is wetted with the resultant emulsion and dried at room temperature. There is employed no heating processing and the resultant articles exhibit not only a marked water repellency but a high degree of resistance to washing and dry cleaning.

The polysiloxanes employed in the invention include methylhydrogenpolysiloxane, copolymers of methylhydrogendichlorosilane and dimethyldichlorosilane, mixtures of methylhydrogenpolysiloxane and dimethylpolysiloxane, and the like substances having a methylhydrogensiloxane unit in the order of more than 50 weight percent. The resultant water repellency is dependent upon the number of the methylhydrogensiloxane unit. Namely, the more the unit, the more excelled the resultant water repellency. Particularly suitable effects are obained with methylhydrogenpolysiloxane.

In actual application, any of the polysiloxanes as specified above is emulsified in a concentration of from 1 to 10 weight percent. Particularly best results are obtained with a concentration of 3 weight percent or thereabout.

The emulsifying agent employed in the invention includes cationic emulsifiers, such as quaternary ammonium salt; anionic emulsifiers, such as dialkyl ester of succinic sulfonate, alkylbenzene sulfonate and aliphatic acid soaps; and nonionic emulsifiers, such as polyoxyethylene sorbitan monolaurate and polyoxyethylene sorbitan monoolate. Of these emulsifiers, quaternary ammonium salt produces most suitable effects.

The metallic salts of lower aliphatic acids employed in the invention are sodium acetate, potassium acetate, calcium acetate, strontium acetate, barium acetate, cadmium acetate, cerium acetate, tin acetate, lead acetate, manganese acetate, iron acetate, nickel acetate, zinc acetate, sodium formate, zinc formate and lithium oxalate. Of these metaalic salts, sodium acetate, potassium acetate, cadmium acetate, lead acetate, manganese acetate, nickel acetate, zinc acetate, zinc formate and lithium oxalate are particularly effective for the treatment of hydrophilic materials.

In operation, any of the aforesaid metallic salts is dissolved in an emulsion of any of the aforesaid polysiloxanes in such a composition that the metallic weight of the metallic salt employed is at least equivalent to the weight of the methylhydrogensiloxane unit contained in the polysiloxane. The desired effects cannot be achieved when the metallic salt is employed in an amount less than said ratio.

The article to be treated is then wetted with the resultant emulsion by a suitable method, such as dipping, coating, spraying or the like, and the article is allowed to dry at room temperature for a day or two. The period of time required for drying the article is dependent upon the species of the emulsifier and the metallic salt employed and the articles to be treated, inclusive of other external factors, such as atmospheric temperature and moisture, ventilation and the like. Heat may be applied for accelerating the drying process, but the application of heat is not an essential factor in the invention,, because there is, as stated before, no need in the invention of decomposing the emulsifier by means of heating.

Thus, the film layer formed onto the surface of the treated articles exhibit marked improvements in physical properties, such as wash durability, flexibility, pliability and softness, not to speak of an excelled water repellency, by the action of the metallic salt employed in an excess amount unprecedented in the art.

The articles which can be treated according to the principles of the present invention include hydrophobic fibers, fabrics and other manufactured articles fabricated from nylon, polyester, cellulose acetate and acrylonitrile; hydrophilic fibers, fabrics and other manufactured articles fabricated from cotton, viscose rayon, polyvinyl alcohol and the like; fibers, fabrics and other manufactured articles fabricated from materials having poor heat resistance, such as linen, jute, hemp, polyvinyl chloride, polyacrylonitrile, polyethylene and paper; and other articles or constructions fabricated from materials which can hardly be subjected to heating processing because of structural inconveniences, such as wood, glass, mortar, concrete and various metals.

Preferred examples are as follows, wherein the spray rating was determined in association with the American Association of Textile Chemists and Colorists' standard test method:

Example 1

In a slight amount of water was dissolved 0.9 gram of benzylcetyldimethylammonium chloride. To this solution there were added 90 grams of methylhydrogenpolysiloxane, and the mixture was dispersed with stirring for 5 minutes in 59.1 cc. of water to make up 150 grams of aqueous emulsion containing 60 weight percent of methylhydrogenpolysiloxane. The resultant emulsion was diluted with water to a concentration of 3 weight percent. Zinc acetate was then added in an amount equivalent by metallic weight to the methylhydrogensiloxane unit. In the resultant emulsion were dipped cotton poplins for 30 minutes, squeezed to the order of 2 times the original weight, and dried at room temperature (30° C.) for 24 hours. Spray rating before and after washing was 100, and the treated fabrics exhibited an excelled good hand and soft touch.

The same marked results as stated above were obtained with sodium acetate, potassium acetate, calcium acetate, cadmium acetate, lead acetate, manganese acetate, nickel acetate, zinc formate and lithium oxalate employed in the place of the aforesaid zinc acetate.

The same excelled results as stated above were also produced on the acetate rayon, nylon and polyester fabrics treated in the same manners as described hereinbefore.

Example 2

A methylhydrogenpolysiloxane-zinc acetate emulsion prepared in the same manners as described in Example 1 was applied by spraying onto concrete pavements in the order of 1./m.² and allowed to stand in the open air for 48 hours to dry. The resultant pavements exhibited a marked water repellency as compared with non-treated pavements.

Example 3

A methylhydrogenpolysiloxane-calcium acetate emulsion prepared in the same manners as described in Example 1 was applied to cotton poplins in a similar manner as described in said example. The spray rating of the finished fabrics was 100.

We claim:
1. A method of rendering an article water repellent comprising wetting the article to be treated with an aqueous emulsion consisting of from 1 to 10 weight percent of a polysiloxane having a methylhydrogensiloxane unit in the order of at least 50 weight percent, and of a metallic salt of an aliphatic acid selected from the group consisting of sodium acetate, potassium acetate, magnesium acetate, calcium acetate, strontium acetate, barium acetate, cadmium acetate, cerium acetate, tin acetate, lead acetate, manganese acetate, iron acetate, nickel acetate, zinc acetate, sodium formate, zinc formate and lithium oxalate, said metallic salt being dissolved there-in in an amount at least equivalent by metallic weight to the methylhydrogensiloxane unit contained in said polysiloxane, and drying the wetted article at room temperature to provide said article with a water repellency resistant to washing.

2. The method of claim 1 wherein the polysiloxane specified is methylhydrogenpolysiloxane.

3. The method of claim 1 wherein the article to be treated is a member selected from the group consisting of materials having poor heat resistance.

4. A method of providing a wash resistant water repellent finish on organic fibrous materials comprising wetting the organic fibrous materials with an aqueous emulsion consisting of from 1 to 10 weight percent of a polysiloxane having a methylhydrogensiloxane unit in the order of at least 50 weight percent, and of a metallic salt of an aliphatic acid selected from the group consisting of sodium acetate, potassium acetate, cadmium acetate, lead acetate, manganese acetate, nickel acetate, zinc acetate, zinc formate and lithium oxalate, said metallic salt being dissolved therein in an amount at least equivalent by metallic weight to the methylhydrogensiloxane unit contained in said polysiloxane, and drying the wetted fibrous materials at room temperature to provide said fibrous materials with a water repellent finish resistant to washing.

References Cited by the Examiner

UNITED STATES PATENTS

| | | | |
|---|---|---|---|
| 2,386,259 | 10/1945 | Norton | 117—123 |
| 2,588,367 | 3/1952 | Dennett | 260—3 |
| 2,588,393 | 3/1952 | Kauppi | 260—18 X |
| 2,645,629 | 7/1953 | Nitzsche | 117—161 X |
| 2,789,956 | 4/1957 | Eder | 117—161 X |
| 2,934,519 | 4/1960 | Clark | 117—161 |

MURRAY KATZ, *Primary Examiner.*

T. G. DAVIS, *Assistant Examiner.*